May 15, 1956 S. A. WILLS ET AL 2,745,188
GAUGING DEVICES FOR CHECKING DIMENSIONS AND INVESTIGATING
THE CONTOUR OR PROFILE OF SURFACES
Filed March 12, 1952 2 Sheets-Sheet 1
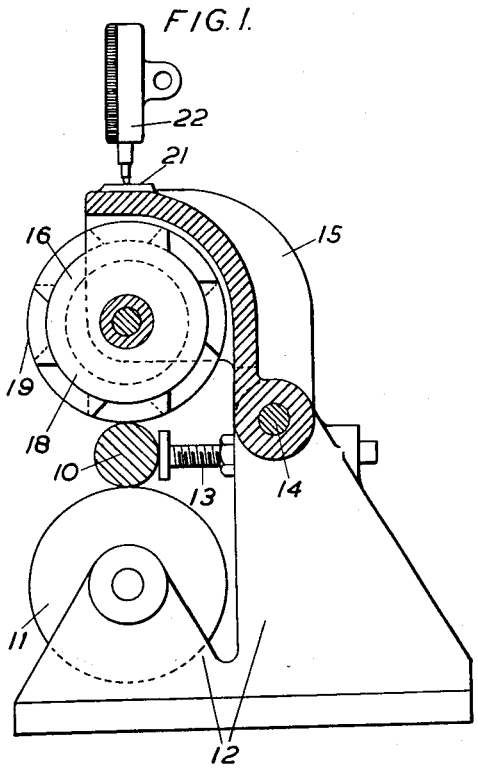
FIG. 1.
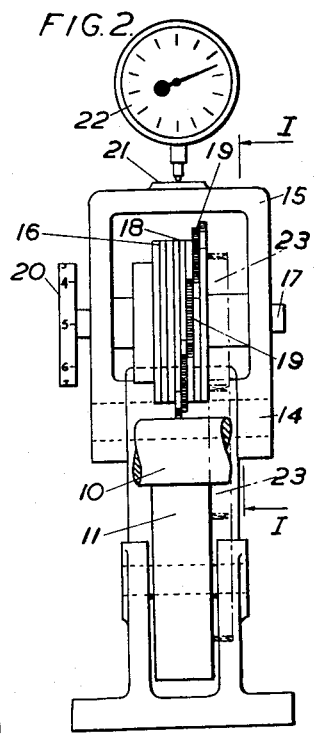
FIG. 2.
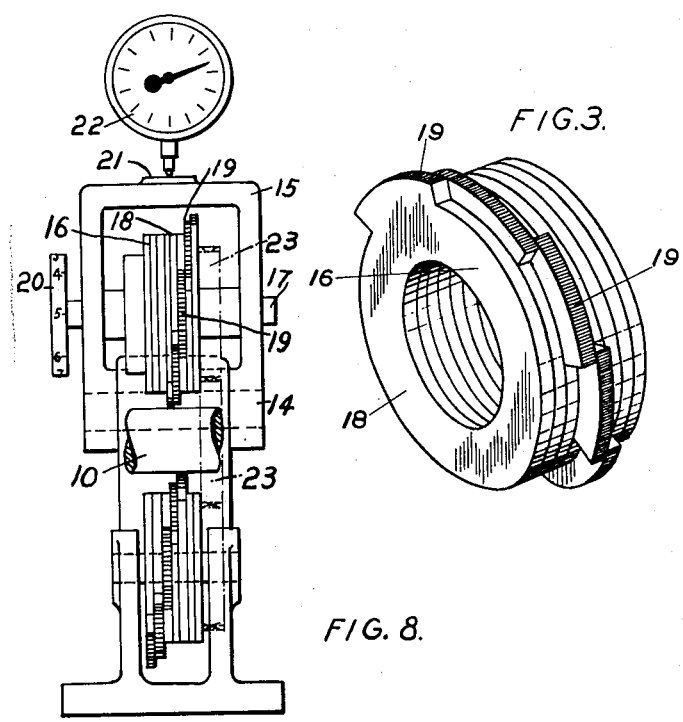
FIG. 3.
FIG. 8.
Inventors
Sydney A. Wills
Evan F. G. Gathercole
By Watson, Cole, Grindle & Watson
Attorneys

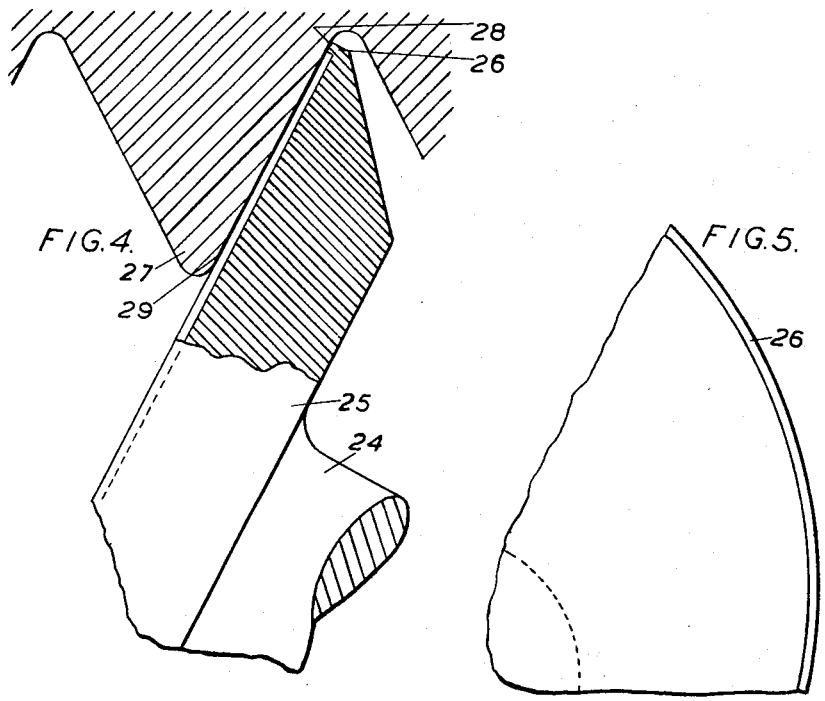
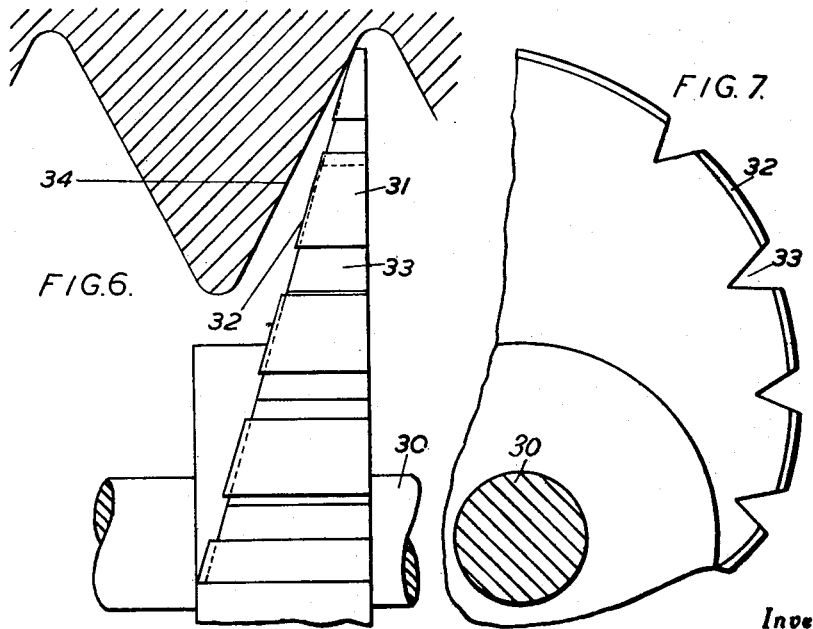

United States Patent Office 2,745,188
Patented May 15, 1956

2,745,188

GAUGING DEVICES FOR CHECKING DIMENSIONS AND INVESTIGATING THE CONTOUR OR PROFILE OF SURFACES

Sydney Arthur Wills, Southfields, London, and Evan Frederick James Gathercole, London, England, assignors to Tolimit Gauges Limited, London, England, a British company Application March 12, 1952, Serial No. 276,196

Claims priority, application Great Britain March 16, 1951

9 Claims. (Cl. 33—199)

This invention relates to gauging devices for checking dimensions and investigating the contour or profile of surfaces. Such devices may be used for investigating whether a surface is truly flat or for determining whether, and if so to what extent, a curved surface departs from a predetermined contour or profile. Certain forms of such devices may be used for ascertaining errors in screw threads.

A device for checking dimensions or for gauging the contour or profile of a surface according to the present invention comprises a reference member and a rotary gauging member provided with a rib formed and arranged so that, as the rotary member is rotated, the point of contact between the rib and the surface of an article under investigation changes, the distance between the reference member and the rotary gauging member either being variable and means being provided for determining changes in this distance, or being fixed and predetermined.

In cases where the rotary gauging member is fixed at a predetermined distance from the reference member the dimensional or other characteristic of the contour or profile of the article under investigation is determined by whether or not the article can be passed between the reference member and the rotary gauging member. With such an arrangement the reference member and the rotary gauging member will usually constitute one pair of gauging members of a "go and not-go" caliper gauge.

Depending upon circumstances, the reference member may be a fixed flat surface or curved surface, or it may be a rotatable member; in some instances it may be similar to the said rotary gauging member.

The term "rib" used in relation to the rotary gauging member is employed for convenience and is to be understood as including formations in which the rib is formed in a series of sections which may either overlap one another or be spaced from one another in the circumferential direction. In other words the rib may be continuous throughout its length so that as the rotary gauging member is rotated the point of contact of the rib with the article under investigation travels progressively along the surface of the article, or it may be interrupted at intervals in its length so that as the rotary gauging member is rotated the point of contact of the rib with the article under investigation moves in a series of steps along the surface of the article with the end of one step and the beginning of the next either overlapping or being separated by a period in which there is no contact between the rib and the article.

In one form of the invention for gauging the form of a screw thread, the rotary gauging member consists of a flat or conical disc having a spiral rib upon its surface which as the disc is rotated sweeps theh flank of a thread of the screw under investigation on a line lying in a plane containing the axis of the screw.

In another form of the invention for gauging the form of a screw thread, the rotary gauging member is in the form of a cylinder bearing on its surface a helical rib.

Certain specific embodiments of the invention will now be described by way of example with reference to the accompanying drawings in which:

Figure 1 is a side elevation, partly in section, of a device for gauging the diameter of a cylindrical article;

Figure 2 is a front elevation of the device shown in Figure 1;

Figure 3 is a perspective view of the rotary gauging member of the device shown in Figures 1 and 2;

Figure 4 is a diagrammatic side view of a rotary gauging member for gauging the form of screw threads;

Figure 5 is a partial front view of the rotary gauging member of Figure 4;

Figures 6 and 7 are views similar to Figures 4 and 5 of a modified form of rotary gauging member for gauging the form of screw threads; and Figure 8 is a view corresponding to Figure 2 of a device including two ribbed rotary gauging members.

The device shown in Figures 1, 2 and 3 is suitable for investigating how closely the diameter of an article 10 conforms to a predetermined standard. The reference member of the device comprises a bed or support for the article in the form of a truly cylindrical roller 11 mounted in a base 12. An adjustable stop 13 is mounted in the base 12 to determine the position of the article 10 upon the roller 11. Mounted upon a pivot 14 on the base 12 is a frame 15 which carries the rotary gauging member 16 fixed to a pivot 17. The rotary gauging member 16 is in the form of a drum built up from a series of plates 18 clamped together, each plate having a radially projecting lug provided with an accurately machined circumferential surface 19. The lugs on adjacent plates are angularly displaced from one another, but overlap one another slightly in the circumeferential direction to form a rib. The pivot 17 for the rotary gauging member carries a handwheel or knob 20 which can be rotated for turning the rotary gauging member. The surface of the handwheel or knob 20 carries registering marks for indicating which of the surfaces 19 is in engagement with the article 10. As best seen in Figure 1, the frame 15 can swing about the pivot 14. Thus should the diameter of the article 10 vary along its length, the frame will move up or down as the rotary gauging member 16 is rotated. On the top of the frame 15 there is a surface 21 on which can bear the pin of a dial or similar gauge 22. By swinging the frame 15 into an operative position the rotary gauging member 16, as shown in Figure 8 can be brought into engagement with the article 10, while by rotating the drum 20 into one position or another, one or other of the surfaces 19 can be caused to engage the article 10 at different points along its length, the readings of the dial gauge 22 giving an indication of any variations in the diameter of the article.

The device shown in Figures 1, 2 and 3 can be subjected to various modifications. For instance instead of having a built-up rotary gauging member this may be formed in one piece with a continuous helical rib. Again, the reference member 11, instead of being in the form of a plain roller, may be made exactly similar to the rotary gauging member 16. These two members may be rotated step by step into a series of gauging positions in each of which a lug on one member engages the diametrically opposite side of the article 10 from the corresponding lug on the other member. A convenient way of causing the two members to rotate together is to connect them by gearing 23 as shown in dotted lines in Figure 2.

With a further modification the device shown in Figures 1, 2 and 3 can be used for gauging the contour of irregularly shaped parts such as turbine blades. In this case the reference member 11 is shaped to support the turbine blade with the surface to be investigated exposed. The rotary gauging member lies above the blade with its axis parallel with the length of the blade. By periodically moving the reference member through predetermined small angles, and by rotating the rotary gauging member so that the rib sweeps the whole length of the turbine blade in each angular position of the reference member, a complete set of readings can be compiled for every point on the exposed surface of the turbine blade. These readings can be compared with a master set so that the exact position and magnitude of any errors in the blade form can be determined.

A similar form of device can be used for gauging articles with flat surfaces. In this case as the rotary gauging member is rotated the rib will sweep along a line of the article under investigation, and if the article is moved into a new position after each sweep the flatness of the whole surface of the article can be ascertained.

For gauging curved surfaces the rib could, if preferred, be given a predetermined contour conforming to the required curvature of the article to be investigated, so that if the surface of the article is correctly shaped there will be no movement of the rotary gauging member towards or away from the reference member. Any inaccuracies in the surface contour will be indicated by movements of the rotary gauging member towards or away from the reference member.

As indicated above, the invention is applicable to the gauging of screw threads. Figures 4 and 5 illustrate diagrammatically one form of the invention for gauging the form of a screw thread. In this case the screw will be mounted on the reference member and may be capable of rotation relatively thereto so that the form of different parts of the thread may be gauged. The rotary gauging member consists of a shaft 24 having at one end a disc 25. Formed on the surface of the disc is a spiral rib 26. The axis of the shaft 24 is inclined to the axis of the screw by an angle equal to half the V angle of the thread so that the surface of the rib 26 lies parallel with the flank of a thread 27 in a plane containing the axis of the thread and the axis of the shaft 24. When the shaft 24 is rotated, the rib 26 sweeps the flank of the thread from the point 28 to the point 29. If the form of the thread is perfect there will be no translatory movement of the rotary gauging member along its axis. On the other hand if the form of the thread is incorrect there will be translatory movement of the rotary gauging member, the direction and magnitude of the movement indicating the nature and extent of the error. By turning the screw and adjusting the rotary gauging member along its axis the investigation can be repeated on a different part of the thread.

In a modified arrangement the axis of the rotary gauging member is permanently parallel with the axis of the screw. In this case the disc at the end of the shaft of the rotary gauging member has a conical form and a spiral rib is formed on the conical surface. One such arrangement is shown in Figures 6 and 7, where the shaft 30 of the rotary gauging member carries a disc 31 having a conical face provided with a spiral rib 32. The edges of the disc are relieved at intervals by notches 33 which interrupt the spiral rib 32. The purpose of these interruptions is to eliminate interference due to the helix angle of the thread. In operation the shaft 30 is rotated step by step to bring each portion of the rib 32 into successive engagement with the flank 34 of the thread at different positions along its length. At the same time the shaft 30 is moved axially by a distance determined by the difference between the cone angle of the spiral rib 32 and the true V angle of the thread. If the form of the thread is correct the distance between the shaft 30 and the axis of the screw will remain constant for all rotational positions of the shaft 30. If on the other hand the form of the thread is incorrect the shaft 30 will move towards or away from the axis of the screw, depending on the nature and magnitude of the error.

What we claim as our invention and desire to secure by Letters Patent is:

1. A measuring instrument comprising a reference member against which an article whose surface is to be investigated can be placed, a rotary gauging member freely movable towards and away from the surface under investigation, said rotary gauging member being provided with a rib formed and arranged to make substantially only a single contact at any instant with the surface of the article under investigation so that as the rotary gauging member is rotated, the area of contact between said rib and the surface of the article under investigation sweeps across said surface, and indicating means for determining changes in the relative positions of said reference member and said rotary gauging member.

2. A measuring instrument as claimed in claim 1 in which said reference member is also rotatable, and is provided with a rib formed and arranged to make substantially only a single contact at any instant with the surface of the article under investigation so that, as the reference member is rotated the area of contact between the rib and the surface of the article under investigation changes.

3. A measuring instrument as claimed in claim 1 in which the rib on said rotary gauging member is continuous throughout its length.

4. A measuring instrument as claimed in claim 1 in which the rib on said rotary gauging member is interrupted at intervals along its length.

5. A measuring instrument as claimed in claim 1, in which said rotary gauging member is in the form of a cylinder bearing on its surface a helical rib.

6. A measuring instrument as claimed in claim 1, in which the rib on said rotary gauging member is of spiral form, the axis of the spiral being parallel to the rotary axis of the gauging member.

7. A measuring instrument as claimed in claim 1, in which said rotary gauging member comprises a conical member, having a spiral rig formed upon its conical surface, the axis of the cone being coincident with the rotary axis of the gauging member.

8. A measuring instrument as claimed in claim 1, in which the rib on said rotary gauging member is in the form of a spiral lying in a plane normal to the rotary axis of the gauging member, and the rotary gauging member is movable relatively to the reference member in a direction parallel to its axis of rotation.

9. A device for investigating the contour of a surface, comprising a support, a reference member mounted on said support, a rotary gauging member mounted on said support for free linear and rotary motion, said rotary gauging member being provided with a rib on the external surface thereof, which rib is so formed and arranged to make substantially only a single effective contact at any instant with the said surface, so that as said rotary gauging member is rotated the contact between said rib and said surface under investigation moves over said surface, and means for determining linear movements of said rotary gauging member.

References Cited in the file of this patent

UNITED STATES PATENTS

| | | |
|---|---|---|
| 1,395,231 | Kenyon | Oct. 25, 1921 |
| 1,423,339 | Ledell | July 18, 1922 |
| 2,027,217 | Zerkle | Jan. 7, 1936 |
| 2,465,182 | Windnagle | Mar. 22, 1949 |